United States Patent [19]

Krone et al.

[11] Patent Number: 4,900,093
[45] Date of Patent: Feb. 13, 1990

[54] IMPACT RIPPER AND CONTROL

[75] Inventors: John J. Krone, Dunlap; Jerry D. Fidler, Peoria, both of Ill.

[73] Assignee: Caterpillar Inc., Peoria, Ill.

[21] Appl. No.: 929,025

[22] Filed: Nov. 10, 1986

[51] Int. Cl.<sup>4</sup> ............... A01B 11/00; A01B 13/08; A01B 35/00
[52] U.S. Cl. .................. 299/37; 37/DIG. 8; 172/2; 172/7; 172/40; 91/461
[58] Field of Search ............... 172/2, 40, 7, 9; 404/117; 173/8, 9; 37/DIG. 18; 74/61, 87; 91/461, 517, 529, 530

[56] References Cited

U.S. PATENT DOCUMENTS

| | | | |
|---|---|---|---|
| 2,734,722 | 2/1956 | Pokorny | 173/8 |
| 3,145,488 | 8/1964 | French | 37/DIG. 18 X |
| 3,743,033 | 7/1973 | Taylor | 299/37 X |
| 4,031,964 | 4/1977 | Takahashi et al. | 172/9 |
| 4,044,838 | 8/1977 | Wooldridge | 172/2 |
| 4,062,539 | 12/1977 | Tetsuka et al. | 172/9 |
| 4,440,236 | 4/1984 | Shiihara et al. | 173/8 |
| 4,638,720 | 1/1987 | McKee et al. | 91/530 X |
| 4,718,329 | 1/1988 | Nakajima et al. | 91/461 X |

FOREIGN PATENT DOCUMENTS 63-31161  2/1988  Japan.
613027  5/1978  U.S.S.R. ............... 172/40

Primary Examiner—Richard T. Stouffer
Attorney, Agent, or Firm—John W. Grant

[57] ABSTRACT

Impact rippers are useful in fracturing rocks, concrete, etc. which cannot be fractured by ripping alone. Operating the impactor of the impact ripper without sufficient loading applied to the ripper tip is detrimental to the life of the impact ripper. The subject control system includes a pilot operated selector valve which blocks pressurized fluid from the impactor in the absence of pilot fluid thereto and is shifted by pressurized pilot fluid to a position to direct pressurized fluid to the impactor. A pressure switch is rendered conductive when the fluid pressure generated in a hydraulic cylinder exceeds a predetermined value due to loading on the ripper tip. This actuates a solenoid valve to direct pressurized pilot fluid to the selector valve. Thus the impactor is activated only when the loading on the ripper tip is above a preselected threshold and is automatically deactivated when the loading on the ripper tip drops below the preselected threshold.

3 Claims, No Drawings

IMPACT RIPPER AND CONTROL

TECHNICAL FIELD

This invention relates generally to an impact ripper and more particularly to a control system therefor to activate a hydraulic impactor in response to a predetermined load being applied to the ripper.

BACKGROUND ART

Rippers attached to the rear end of track-type vehicles are commonly used to fracture or break up rock, concrete, asphalt, and the like into smaller pieces for easier handling. Some of the rippers are provided with an impactor having an oscillating impact element which impacts against the shank of the ripper to aid in the fracturing of extremely hard material. To be effective, the impactors are designed to impart large amounts of kinetic energy into the ripper shank. One of the problems encountered with such an impact ripper is that when the impact ripper is ripping rock, the ripper tip quite frequently encounters fissures, pockets of sand or other weak areas in the rock wherein the loading against the tip drops off drastically. When the impactor is operated without sufficient loading against the ripper tip to absorb the kinetic energy generated by the impactor, severe shock loads are transmitted into the impactor housing and/or the ripper frame. This commonly leads to early fatigue failures in the impactor housing and/or ripper frame.

The present invention is directed to overcoming one or more of the problems as set forth above.

DISCLOSURE OF THE INVENTION

In one aspect of the present invention, a control system is provided for an impact ripper having a ripper frame, a ripper shank pivotally mounted to the ripper frame and having a ripper tip connected thereto, and a hydraulically activated impactor connected to the ripper frame and having an impact element positioned for impact engagement with the shank. The control system comprises a pump and a valve connected to the pump and adapted to be connected to the impactor. The valve is movable between a first position at which fluid flow between the pump and impactor is blocked and a second position at which pressurized fluid from the pump is directed to the impactor. A means is provided for shifting the valve to the second position in response to a force greater than a preselected level being applied to the ripper tip.

In another aspect of the present invention, a control system is provided for an impact ripper having a ripper frame, a shank pivotally mounted to the ripper frame and having a tip connected to the lower end thereof, a hydraulically activated impactor connected to the support frame and having an impact element positioned for impact engagement with the shank, and at least one hydraulic cylinder adapted to selectively change the position of the shank and being connected to the ripper frame in a manner so that fluid pressure is generated in one end thereof in response to the ripper forcibly engaging the material to be ripped. The control system includes a pump and a valve connected to the pump and adapted to be connected to the impactor. The valve is movable between a first position at which fluid flow between the pump and the impactor is blocked and a second position at which pressurized fluid is directed from the pump to the impactor. A means is provided for shifting the valve to the second position in response to the fluid pressure in the one end of the hydraulic cylinder exceeding a predetermined value.

The present invention provides an improved control system for an impact ripper which in the primary mode of operation depends upon a predetermined force or loading on the ripper tip of the ripper before the impactor is activated. This eliminates so called "blank firing" of the impactor when there is insufficient loading on the tip to fully absorb all the impact energy developed by the impactor. Eliminating the blank firing thus eliminates the high shock loads to the impactor housing and/or ripper frame and thereby increases the service life of the impact ripper.

BRIEF DESCRIPTION OF THE DRAWINGS

FIG. 2 is a side elevational view of the impact ripper utilizing the present invention.

BEST MODE FOR CARRYING OUT THE INVENTION

Figure 1:
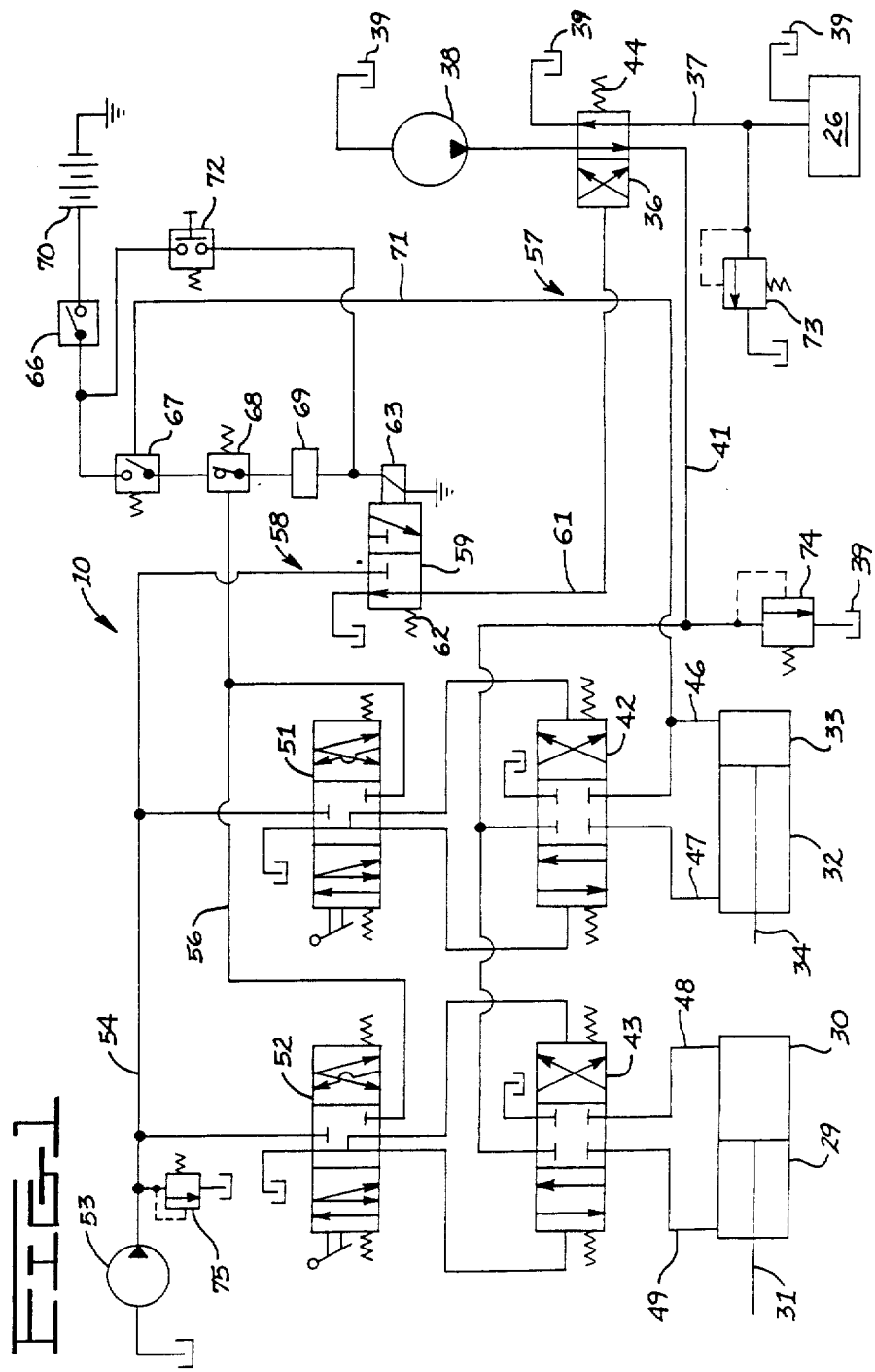
FIG. 1 is a schematic illustration of an embodiment of the present invention.

A control system 10 is shown in FIG. 1 for controlling the operation of an impact ripper 11 shown in FIG. 2. The impact ripper 11 includes a ripper frame 12 having a mounting bracket 13 adapted to be connected to a track-type tractor or other towing vehicle. A rearwardly extending linkage 14 is pivotally connected to the mounting bracket 13 at a pivot 16. A support beam 17 is pivotally connected at a pivot 18 to the distal end of the linkage 14. A ripper shank 19 is pivotally connected to the support beam 17 at a pivot 21 and has a material engaging ripper tip 22 suitably connected to its lower end. A stop 23 is secured to the support beam 17 and limits forward pivoting of the ripper shank 19. A stop 24 is secured to the support beam 17 and limits rearward pivoting of the shank 19. A hydraulically activated impactor 26 is mounted on the support beam 17 rearwardly of the ripper shank 19 and has an impact element 27 positioned for impact engagement with a rear surface 28 of the ripper shank 19. The elevational position of the impact ripper is controlled by a hydraulic cylinder 29 having a head end 30 connected to the bracket 13 and its rod 31 connected to the linkage 14. The angle of the ripper shank 19 is controlled by a hydraulic cylinder 32 having its head end 33 connected to the bracket 13 and its rod 34 connected to the support beam 17. The impactor 26 in this embodiment is a hydraulic hammer which drives the impact element 27 in a rectilinear direction.

The control system 10 includes a pilot operated selector valve 36 hydraulically connected to the impactor 26 through a conduit 37, a pump 38 connected to the selector valve 36, and a tank 39 connected to the pump and the selector valve. A conduit 41 also connects the selector valve to first and second pilot operated directional valves 42, 43. The selector valve 36 is shown at a first position at which pressurized fluid from the pump 38 is directed through the conduit 41 to the first and second directional valves and fluid from the pump is blocked from the impactor 26. The selector valve is movable to a second position at which pressurized fluid from the pump is directed to the impactor and is blocked from the conduit 41 and hence the directional valves 42 and 43. A spring 44 positioned at one end of the selector valve 36 resiliently biases the selector valve to the first position. The selector valve is moved to the second position by pressurized pilot fluid directed to the other end thereof.

The first directional valve 42 is connected to the head end 33 and rod end of the hydraulic cylinder 32 through a pair of cylinder conduits 46,47. Similarly, the second directional valve 43 is connected to opposite ends of the hydraulic cylinder 29 through a pair of cylinder conduits 48,49. Each of the directional valves is shown in its neutral position at which communication between the conduit 41 and the respective hydraulic cylinder 29,32 is blocked and the opposite ends of the cylinders are isolated from each other. Each of the directional valves is movable leftwardly to a first operating position at which fluid is directed to the respective hydraulic cylinder to cause extension thereof and movable rightwardly to a second operating position at which pressurized fluid is directed to the respective hydraulic cylinder to cause retraction thereof.

A first manually operated pilot valve 51 is connected to opposite ends of the first directional valve 42 and a second manually operated pilot valve 52 is connected to opposite ends of the second directional valve 43. A source of pressurized pilot fluid such as a pilot pump 53 is connected to the first and second pilot valves through a pilot supply line 54. A pilot fluid signal line 56 is also connected to both of the pilot valves 51,52 for a later defined purpose. In the position shown, each of the pilot valves block the flow of pressurized pilot fluid from the ends of the respective directional valve 42,43. Each of the pilot valves is movable rightwardly to a first operating position at which pressurized pilot fluid is directed to the right hand end of the respective directional valve to move it to its first position and movable leftwardly to a second operating position at which pressurized pilot fluid is directed to the left end of the respective directional valve to move it to its second position. At both operating positions of the pilot valves, pressurized pilot fluid is directed through the signal line 56.

The control system 10 also includes a means 57 for shifting the selector valve 36 to the second position in response to a force greater than a preselected level being applied to the ripper tip 22. The shifting means 57 includes a means 58 for directing pressurized pilot fluid to the selector valve when the force greater than the preselected level is applied to the tip 22. The directing means 58 includes a solenoid actuated pilot valve 59 connected to the pilot supply line 54 and to the end of the selector valve 36 through a pilot line 61. The pilot valve 59 is shown in a first position at which pressurized fluid from the pilot pump 53 is blocked from the selector valve 36. The pilot valve 59 is movable to a second position at which pressurized pilot fluid is directed to the end of the selector valve. A spring 62 resiliently biases the pilot valve 59 to the first position. The pilot valve 59 includes a electrical solenoid 63 and is moved to the second position upon directing an electrical current to energize the solenoid 63.

A manually controlled toggle switch 66, a first pressure switch 67, a second pressure switch 68, and a normally conductive relay 69 are connected in series between a source of electrical energy such as a battery 70 and the solenoid 63 of the pilot valve 59. The toggle switch 66 is selectively shiftable between a nonconductive position as shown to a conductive position. A signal line 71 hydraulically connects the first pressure switch to the head end 33 of the hydraulic cylinder 32. The first pressure switch 67 is normally in a nonconductive position shown and is moved to a conductive position when the fluid pressure in the head end of the hydraulic cylinder 32 exceeds the predetermined value. The second pressure switch 68 is connected to the pilot fluid signal line 56. The second pressure switch 58 is normally in a conductive position shown and is shifted to a nonconductive position when pressurized pilot fluid is directed thereto through the signal line 56 when either of the pilot valves 51,52 is shifted to an operating position. The relay 69 is triggered to a nonconductive condition automatically when the vehicle to which the impact ripper 11 is attached is shifted to reverse drive. A manually operated override switch 72 is connected in parallel to the first and second pressure switches between the toggle switch 66 and the solenoid 63. The battery 70, pressure switch 67, conduit 71, and toggle switch 66 also make up part of the shifting means 57.

A relief valve 73 is connected to the line 37 to protect the impactor 26 from excessive fluid pressures. Similarly, a relief valve 74 is connected to the conduit 41 for limiting the fluid pressure therein to a predetermined maximum. Also, a relief valve 75 is connected to the pilot supply line 54 to maintain the pilot pressure therein substantially at a predetermined level.

Industrial Applicability

In use, during the normal impact ripping mode of operation, activating the impactor 26 is dependent upon manually closing the toggle switch 66 and the fluid pressure in the head end 33 of the hydraulic cylinder 32 exceeding a predetermined value in order to move the pressure switch 67 to a conductive position. The fluid pressure in the head end 33 of the hydraulic cylinder 32 is generated by pulling the ripper shank 19 and tip 22 through the material to be ripped. In so doing, the shank 19 abuts the stop 24 and thereby tends to pivot the support beam 17 about the pivot 18. Such pivoting is resisted by the fluid in the head end of the hydraulic cylinder 32 with the fluid therein being pressurized. The force applied to the ripper tip 22 is normally greater than the preselected level and thus the fluid pressure in the head end of the hydraulic cylinder 32 will normally be greater than the predetermined value in the normal impact ripping mode. The pressure switch 67 is thus moved to the conductive position to complete the electrical circuit from the battery 70 through the toggle switch 66, both pressure switches 67 and 68 and the reverse relay 69 to the solenoid 63 of the solenoid actuated pilot valve 59 thereby energizing the solenoid 63 which shifts the solenoid pilot valve 59 to the second position. This directs pressurized pilot fluid through the line 61 to the selector valve 36 shifting it to its second position to direct pressurized fluid from the pump 38 through the conduit 37 to the impactor 26. The impactor 26 is thus activated causing the impact element 27 to repeatedly impact against the rear surface 28 of the shank 19 thereby causing the tip 22 to impact against the material in contact therewith.

Should the ripper tip 22 be pulled through a fissure, a pocket of sand, or other weakened area below the surface of the rock being ripped, the force acting on the tip can drop below the preselected level so that the fluid pressure in the head end of the hydraulic cylinder 32 drops below the predetermined value. When this happens, the pressure switch 67 immediately moves to the nonconductive position breaking the electrical circuit to the solenoid 63 of the solenoid pilot valve to the selector valve 36 allowing the selector valve to move to the first position blocking fluid flow to the impactor 26 thereby deactivating the impactor 26.

The impactor 26 is also automatically deactivated when either of the pilot valves 51 and 52 are used to change either the attitude or the elevational position of the shank 19. This is accomplished by directing pressurized pilot fluid through the signal line 56 to the pressure switch 68 when one or both of the pilot valves 51,52 are shifted to an operating position. The pressurized pilot fluid renders the pressure switch 68 nonconductive thereby breaking the electrical circuit to the solenoid 63 of the solenoid pilot valve 59 which results in the selector valve 36 moving to the first position. The selector valve at the first position blocks flow of pressurized fluid to the impactor 26 and directs the flow from the pump 38 through the conduit 41 where it becomes available for use by one or both of the directional control valves 42 and 43 depending upon which of the pilot valves 51 or 52 is at an operating position. When the pilot valve 51 or 52 is returned to its neutral position, the flow of pressurized pilot fluid to the pressure switch 68 is blocked allowing it move to the conductive position to reenergize the solenoid 63 of the solenoid pilot valve 59. As previously noted, this results in activating the impactor 26.

The impact ripper 11 can also be selectively used in an impact hammer type of operation. For example, after an impact ripping pass, occasionally a large rock will be pushed aside rather than being broken. In such case, the vehicle is maneuvered so that the tip 22 bears against the top of the large rock. The switch 72 is then manually triggered to a conductive position to energize the solenoid 63. As previously noted, this results in activating the impactor 26 to cause the impact element 27 to repeatedly impact against the shank.

In view of the above, it is readily apparent that the structure of the present invention provides an improved control system for an impact ripper which activates the impactor only when there is sufficient resistance imposed against the shank to absorb the high impact energy of the impactor. This eliminates the high shock loads which would otherwise be absorbed by the impactor housing and/or ripper frame when the tip passes through a weak area in the material being ripped. After the tip passes through the weak area and again encounters solid rock sufficient to generate pressure in the head end of the hydraulic cylinder above the predetermined valve, the impactor is automatically reactivated without any operator input.

Other aspects, objects, and advantages of this invention can be obtained from a study of the drawings, the disclosure, and the appended claims.

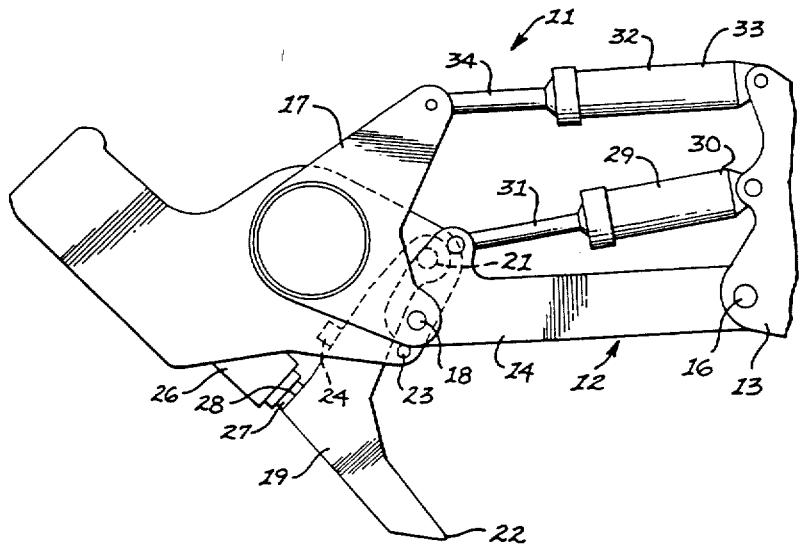

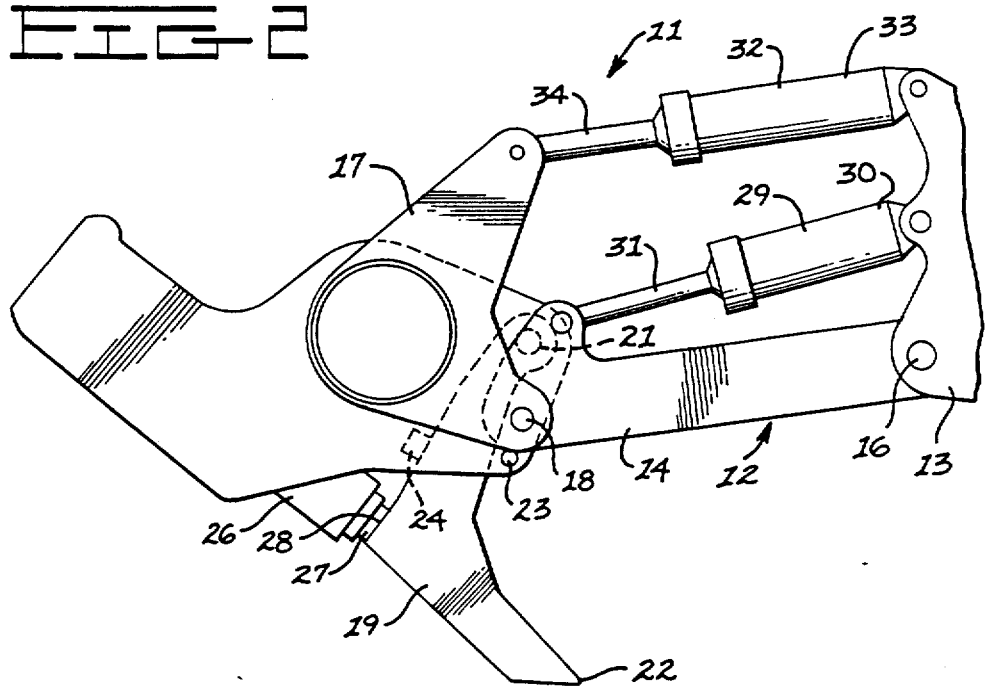

We claim:

1. An impact ripper and control therefor comprising:
   a ripper frame;
   a ripper shank connected to the ripper frame;
   a ripper tip connected to the ripper shank;
   a hydraulically activated impactor connected to the ripper frame and having an impact element positioned to direct impact energy to the tip;
   a pump;
   a pilot operated valve connected to the pump and to the hydraulically activated impactor, said valve being movable between a first position at which fluid flow between the pump and the impactor is blocked and a second position at which pressurized fluid from the pump is directed to the impactor;
   a source of pressurized pilot fluid; and
   means for directing pressurized pilot fluid to the pilot operated valve for shifting the valve to the second position when a force greater than a preselected level is applied to the tip, said means including a pilot valve disposed between the source of pilot fluid and the pilot operated valve.

2. The impact ripper and control therefor of claim 1 wherein said pilot valve is a solenoid actuated pilot valve and including at least one hydraulic cylinder adapted to selectively change the position of the ripper shank and being connected to the ripper frame so that a fluid pressure exceeding a preselected value is generated in one end thereof when said force greater than the preselected level is applied to the tip, said means including a source of electrical energy, a pressure switch connected between the source of electrical energy and the solenoid actuated pilot valve and a conduit connecting the one end of the hydraulic cylinder to the pressure switch, said pressure switch being normally nonconductive and being movable to a conductive position when the fluid pressure in the one end of the hydraulic cylinder exceeds said predetermined value.

3. The impact ripper and control therefor of claim 2 wherein said means includes a manual toggle switch connected in series with the pressure switch and is selectively shiftable between a conductive position and nonconductive position wherein both the manual toggle switch and the pressure switch must be in the conductive position to energize the solenoid actuated pilot valve.

* * * * *

UNITED STATES PATENT AND TRADEMARK OFFICE
CERTIFICATE OF CORRECTION

PATENT NO. : 4,900,093

DATED : Feb. 13, 1990

INVENTOR(S) : John J. Krone, et al

It is certified that error appears in the above-identified patent and that said Letters Patent is hereby corrected as shown below:

The title page should be deleted to appear as per attached title page.

The sheets of Drawing consisting of Figs. 1 and 2 should be inserted as per attached sheets.

Signed and Sealed this

Fourteenth Day of August, 1990

Attest:

HARRY F. MANBECK, JR.

*Attesting Officer*    *Commissioner of Patents and Trademarks*

United States Patent [19]

Krone et al.

[11] Patent Number: 4,900,093
[45] Date of Patent: Feb. 13, 1990

[54] IMPACT RIPPER AND CONTROL

[75] Inventors: John J. Krone, Dunlap; Jerry D. Fidler, Peoria, both of Ill.

[73] Assignee: Caterpillar Inc., Peoria, Ill.

[21] Appl. No.: 929,025

[22] Filed: Nov. 10, 1986

[51] Int. Cl.⁴ .................. A01B 11/00; A01B 13/08; A01B 35/00
[52] U.S. Cl. .................. 299/37; 37/DIG. 8; 172/2; 172/7; 172/40; 91/461
[58] Field of Search .................. 172/2, 40, 7, 9; 404/117; 173/8, 9; 37/DIG. 18; 74/61, 87; 91/461, 517, 529, 530

[56] References Cited

U.S. PATENT DOCUMENTS

| | | | |
|---|---|---|---|
| 2,734,722 | 2/1956 | Pokorny | 173/8 |
| 3,145,488 | 8/1964 | French | 37/DIG. 18 X |
| 3,743,033 | 7/1973 | Taylor | 299/37 X |
| 4,031,964 | 4/1977 | Takahashi et al. | 172/9 |
| 4,044,838 | 8/1977 | Wooldridge | 172/2 |
| 4,062,539 | 12/1977 | Tetsuka et al. | 172/9 |
| 4,440,236 | 4/1984 | Shiihara et al. | 173/8 |
| 4,638,720 | 1/1987 | McKee et al. | 91/530 X |
| 4,718,329 | 1/1988 | Nakajima et al. | 91/461 X |

FOREIGN PATENT DOCUMENTS

| | | | |
|---|---|---|---|
| 63-31161 | 2/1988 | Japan . | |
| 613027 | 5/1978 | U.S.S.R. | 172/40 |

Primary Examiner—Richard T. Stouffer
Attorney, Agent, or Firm—John W. Grant

[57] ABSTRACT

Impact rippers are useful in fracturing rocks, concrete, etc. which cannot be fractured by ripping alone. Operating the impactor of the impact ripper without sufficient loading applied to the ripper tip is detrimental to the life of the impact ripper. The subject control system includes a pilot operated selector valve which blocks pressurized fluid from the impactor in the absence of pilot fluid thereto and is shifted by pressurized pilot fluid to a position to direct pressurized fluid to the impactor. A pressure switch is rendered conductive when the fluid pressure generated in a hydraulic cylinder exceeds a predetermined value due to loading on the ripper tip. This actuates a solenoid valve to direct pressurized pilot fluid to the selector valve. Thus the impactor is activated only when the loading on the ripper tip is above a preselected threshold and is automatically deactivated when the loading on the ripper tip drops below the preselected threshold.

3 Claims, 2 Drawing Sheets